(12) United States Patent
Moore et al.

(10) Patent No.: US 7,706,254 B2
(45) Date of Patent: Apr. 27, 2010

(54) METHOD AND SYSTEM FOR PROVIDING ETHERNET PROTECTION

(75) Inventors: Francois Georges Joseph Moore, McKinney, TX (US); Michael Davis White, Richardson, TX (US); Jimmy O. Goodwin, Lucas, TX (US); John Douglas Weich, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 597 days.

(21) Appl. No.: 11/564,649

(22) Filed: Nov. 29, 2006

(65) Prior Publication Data

US 2008/0124073 A1    May 29, 2008

(51) Int. Cl.
*G01R 31/08* (2006.01)

(52) U.S. Cl. ...................................... 370/219

(58) Field of Classification Search ................ 370/217, 370/219, 228, 216, 218, 225; 714/43
See application file for complete search history.

(56) References Cited

U.S. PATENT DOCUMENTS

| | | | |
|---|---|---|---|
| 5,822,299 A * | 10/1998 | Goodman | ................. 370/228 |
| 6,717,909 B2 | 4/2004 | Leroux et al. | |
| 6,856,600 B1 | 2/2005 | Russell et al. | |
| 6,941,388 B1 | 9/2005 | Doraiswami | |
| 6,950,968 B1 * | 9/2005 | Parolari et al. | ................. 714/43 |
| 6,973,041 B1 | 12/2005 | Duschatko et al. | |
| 6,978,309 B1 | 12/2005 | Dorbolo | |
| 7,003,690 B2 | 2/2006 | Liva et al. | |
| 7,039,732 B1 | 5/2006 | House | |
| 7,065,038 B1 * | 6/2006 | Brandt et al. | ................. 370/219 |
| 2002/0181392 A1 | 12/2002 | Okuno | |
| 2003/0081540 A1 * | 5/2003 | Jones et al. | ................. 370/217 |
| 2004/0098501 A1 | 5/2004 | Finn | |
| 2004/0107382 A1 | 6/2004 | Doverspike et al. | |
| 2004/0114510 A1 | 6/2004 | Miller et al. | |
| 2004/0228278 A1 | 11/2004 | Bruckman et al. | |
| 2005/0007951 A1 | 1/2005 | Lapuh et al. | |
| 2005/0094553 A1 | 5/2005 | Zhou et al. | |
| 2005/0122897 A1 | 6/2005 | Gonda | |
| 2005/0169322 A1 | 8/2005 | Chen et al. | |
| 2005/0180749 A1 | 8/2005 | Koley et al. | |
| 2005/0213547 A1 | 9/2005 | Meier | |
| 2005/0243716 A1 | 11/2005 | Bitar et al. | |
| 2006/0020854 A1 | 1/2006 | Cardona et al. | |

* cited by examiner

*Primary Examiner*—Derrick W Ferris
*Assistant Examiner*—Stephen W Brown
(74) *Attorney, Agent, or Firm*—Baker Botts L.L.P.

(57) ABSTRACT

A method is provided for providing protection of a local area network (LAN) connection that includes providing first and second LAN cards in a multi-service platform. The first and second LAN cards each include at least one port. The first and second LAN cards are coupled to a network edge device through their respective ports to communicate LAN traffic. The method also includes designating the first LAN card as an active card and the second LAN card as an inactive card. The method further includes detecting a network failure associated with the first LAN card. The method further includes protecting LAN traffic communicated between the second LAN card and the LAN by designating the second LAN card as an active card and the first LAN card as an inactive card.

7 Claims, 5 Drawing Sheets

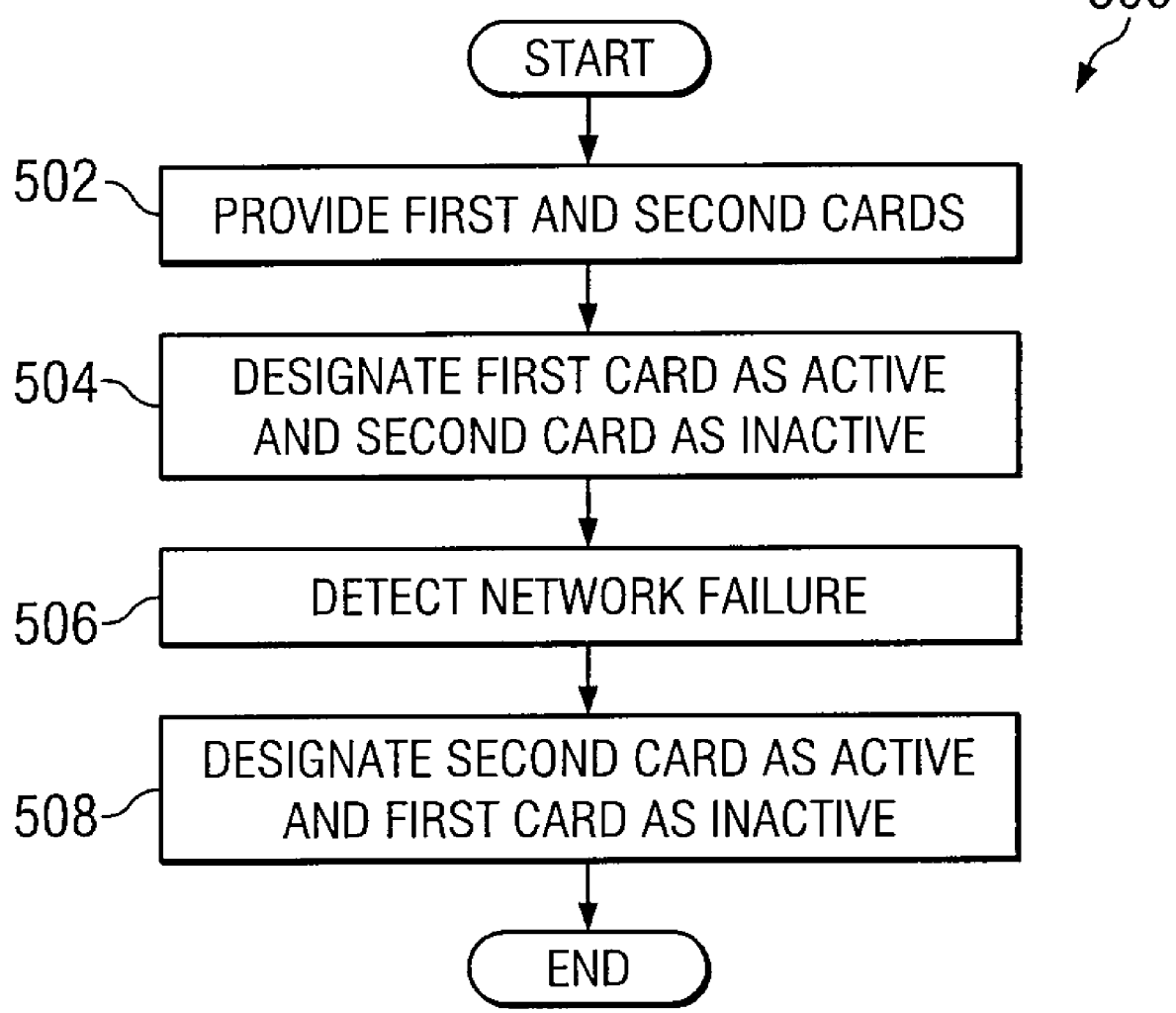

US 7,706,254 B2

METHOD AND SYSTEM FOR PROVIDING ETHERNET PROTECTION

TECHNICAL FIELD OF THE INVENTION

The present invention relates generally to communication systems and, more particularly, to a method and system for providing Ethernet protection.

BACKGROUND OF THE INVENTION

Telecommunications systems, cable television systems and data communication networks use networks to rapidly communicate large amounts of information between remote points. One type of network used to communicate such information is an optical network. In an optical network, information is communicated in the form of optical signals through optical fibers. Although many different types of optical networks may be used depending on the particular application and network size, one common type of optical network is a Synchronous Optical Network (SONET).

In SONET networks, as well as other types of optical and non-optical networks, it is important to provide equipment redundancy to protect against failures in the communication of information over the network. SONET networks may implement numerous types of protection techniques to address failures in the network, such as a node failure or a fiber cut. For example, SONET may employ redundant communication links. Therefore, in the event of a communication link outage, an alternate link may be provisioned.

Heterogeneous networks are increasingly being deployed by carriers of service provider networks for multi-service delivery. Heterogeneous networks are being driven today by the availability of multi-service platforms that can support many types of data traffic. For example, a multi-service platform may support Ethernet traffic for local area networks (LANs) and SONET traffic in metropolitan area networks (MANs). However, unlike SONET, Ethernet services are typically unprotected and operate under a "best effort" delivery system. Best effort services are not guaranteed and therefore do not provide high levels of reliability. It is generally desirable to provide high levels of reliability in heterogeneous networks.

SUMMARY OF THE INVENTION

The present invention provides a method and system for providing Ethernet protection that substantially eliminates or reduces at least some of the disadvantages and problems associated with previous methods and systems.

In accordance with a particular embodiment of the present invention, a method for providing protection of a local area network (LAN) connection includes providing first and second LAN cards in a multi-service platform. The first and second LAN cards each include at least one port. The first and second LAN cards are coupled to a network edge device through their respective ports to communicate LAN traffic. The method also includes designating the first LAN card as an active card and the second LAN card as an inactive card. Designating the first LAN card as an active card includes activating the port of the first LAN card such that LAN traffic is communicated from the port to the network edge device. Designating the second LAN card as an inactive card includes deactivating the port of the second LAN card such that LAN traffic is not communicated from the port to the network edge device. The method further includes detecting a network failure associated with the first LAN card. The method further includes protecting LAN traffic communicated between the second LAN card and the LAN by designating the second LAN card as an active card and the first LAN card as an inactive card.

Technical advantages of particular embodiments of the present invention include a method and system for providing Ethernet protection that supports reliable data transport beyond the standard Ethernet "best effort" services. Accordingly, risks associated with potential network failures are significantly reduced.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 5 illustrates an example method for providing protection for an Ethernet connection, in accordance with one embodiment of the present invention.

DETAILED DESCRIPTION OF THE INVENTION

Figure 1:
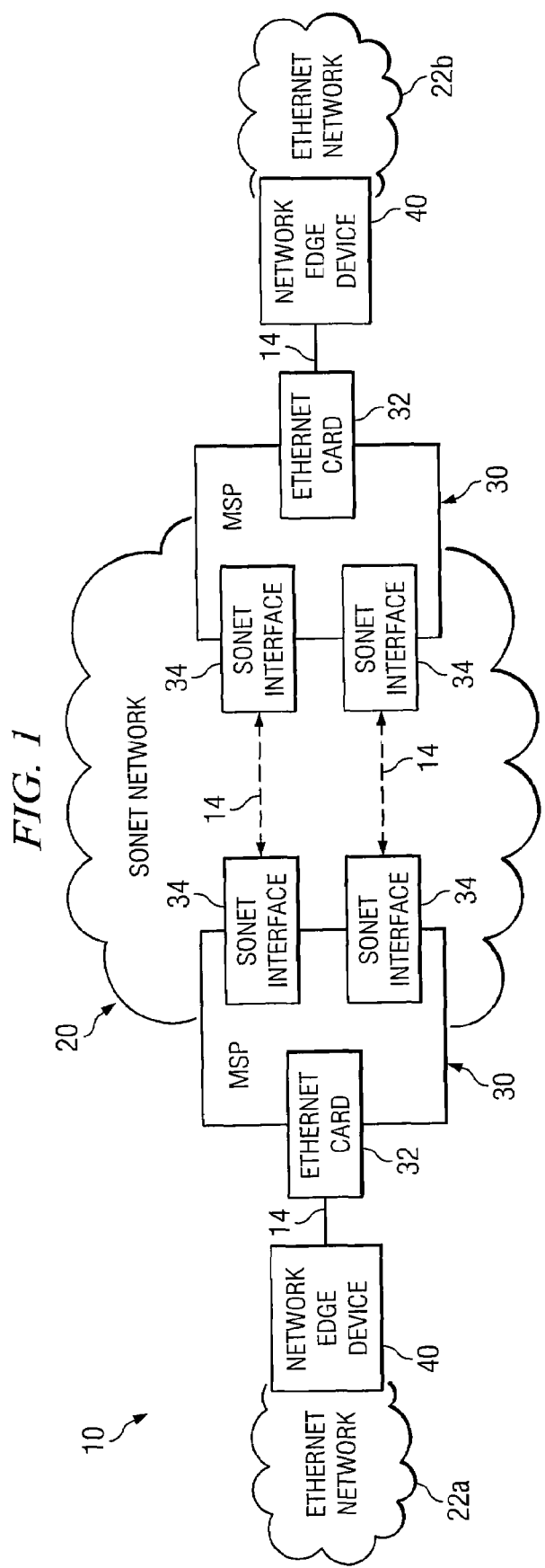
FIG. 1 is a block diagram illustrating an example heterogeneous network for communicating information over communication links.

FIG. 1 is a block diagram illustrating an example heterogeneous network 10 for communicating information over communication links 14. Network 10 generally represents any collection of hardware and/or software that communicates information between, and among, SONET network 20 and Ethernet networks 22. For example, a communication session may be established between one or more devices included in Ethernet network 22a and one or more devices in Ethernet network 22b via SONET network 20. According to one embodiment, Ethernet traffic may be communicated between Ethernet networks 22 and an associated multi-service platform (MSP) 30. As will be described in more detail below, MSP 30 may convert Ethernet traffic received from a network edge device 40 to SONET traffic by creating a synchronous steam of data from the Ethernet traffic. The synchronous stream may be communicated to SONET network 20. Similarly, MSP 30 may convert received SONET traffic to Ethernet traffic for communication from SONET network 20 to Ethernet networks 22 via network edge device 40. In this way, traffic may be communicated between Ethernet networks 22 via SONET network 20.

As discussed above, network 10 operates to provide services such as communication sessions between devices in Ethernet networks 22. A communication session may refer to an active communication between endpoints, measured from endpoint to endpoint. Information is communicated during a communication session. Information may refer to voice, data, text, audio, video, multimedia, control, signaling, other information, or any combination of the preceding. The information may be communicated using data traffic. Data traffic, also referred to as signals in this disclosure, generally refer to one or more bits of data, address, control or any combination thereof transmitted in accordance with any chosen scheme. Data traffic may be data, voice, address, and/or control in any representative format or protocol, such as Ethernet traffic for Ethernet protocols and SONET traffic for SONET protocols.

Network 10 may utilize any suitable communication protocols and technologies to provide communication sessions. Example communication protocols and technologies include those described by the Institute of Electrical and Electronics Engineers, Inc. (IEEE) 802.xx standards, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

Although SONET and Ethernet networks are described, SONET network 20 and Ethernet networks 22 may represent any suitable communication network. A communication network may represent all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. Link 14 within network 10 may refer to any suitable physical or virtual information carrying media that establishes a communication pathway such as, for example, optical fiber, electrical wire, cable, bus traces, wireless channels, or any other suitable physical or virtual media.

Components of network 10 may include logic, an interface, memory, other component, or any suitable combination of the preceding. "Logic" may refer to hardware, software, other logic, or any suitable combination of the preceding. Certain logic may manage the operation of a device, and may include, for example, a processor. "Interface" may refer to logic of a device operable to receive input for the device, send output from the device, perform suitable processing of the input or output or both, or any combination of the preceding, and may include one or more ports, conversion software, or both. "Memory" may refer to logic operable to store and facilitate retrieval of information, and may include a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

As mentioned above, network 10 includes one or more network edge devices 40 and MSPs 30. Network edge device 40 may represent any device operable to communicate information between Ethernet network 22 and MSP 30. Network edge device 40 may be, for example, a router, hub, switch, gateway, access point, endpoint, edge point, or any other hardware, software, or embedded logic implementing any suitable communication protocol to allow for the communication of information between Ethernet networks 22 and MSP 30.

MSP 30 may represent any suitable device that is operable to provide an interface between Ethernet networks 22 and SONET network 20 in any suitable fashion. For example, MSPs 30 are each operable to communicate with an associated network edge device 40 using Ethernet cards 32 and communicate SONET traffic over SONET network 20 using SONET interfaces 34. MSP 30 may also convert Ethernet traffic to SONET traffic, and SONET traffic to Ethernet traffic. For example, MSP 30 may be a Multiservice Provisioning Platform (MSPP) operable to convert traffic using Ethernet over SONET (EOS) framers. EOS framers may refer to components that conform to a group of standards for communication of Ethernet traffic in SONET traffic. EOS framers may convert traffic using one or more techniques, such as virtual concatenation (VC), link capacity adjustment scheme (LCAS), generic framing procedure (GFP), link access procedure for SDH (LAPS), or any other suitable techniques.

SONET network 20 may be any suitable network capable of transmitting voice and data information. SONET network 20, for example, may have any type of network configuration, such as a point-to-point network, a point-to-multipoint network, a hub network, or a ring network. Embodiments of the present invention may apply equally to other types of synchronous optical networks, such as synchronous digital hierarchy (SDH) networks, or to other WANS, such as asynchronous transfer mode (ATM) networks and Frame Relay networks.

Network 10 may experience network failures which may cause an interruption in communication sessions provided over network 10. A network failure may refer to any connectivity outage, such as link outages (fiber cuts, transmitter failures) and equipment outages (mis-configuration, processor or line card failures, power glitches, power supply failures). Network failures are problematic because it is often necessary to quickly restore connectivity following an outage, often within certain constraints and performance levels so as not to affect the traffic transported. Thus, many traffic-engineered networks that carry critical, high-priority traffic may require protection against network failures.

SONET networks, such as SONET network 20, may protect against network failures using various protection techniques. For example, SONET network 20 may provide protection using a self-healing ring network. A ring network is a network topology where all MSPs 30 are attached to the same set of physical links. The links in a ring network may form a loop. All links in a ring network may be unidirectional and traffic may flow in one direction on one half of the links, and in the reverse direction on the other half. Self-healing rings are particular ring networks that re-route traffic to provide protection. In the example, SONET traffic is sent from a source to a destination in one direction on a particular link. If the link fails, then the other direction may be used to reach the destination such that the failed link is avoided. Other embodiments of SONET protection techniques may also be used, such as mesh architectures and Automatic Protection Switching.

Ethernet networks, such as Ethernet network 22, are typically unprotected and provide only a "best effort" delivery system. Best effort services are not guaranteed and therefore do not provide high levels of reliability. Restoration of network connectivity in the event of a network failure in such networks may take several minutes, causing a disruption of service in the interim. Long outages may become a significant concern when the aim is to provide highly reliable service and uptime. For example, in SONET networks, the required recovery times may be in the order of tens of milliseconds.

Various techniques to provide Ethernet protection include trunking protocols, such as Link Aggregation defined as part of an IEEE specification 802.3ad. These protocols provide a means to aggregate multiple links between two Ethernet cards. If one or multiple links in the aggregation fail, network traffic may be dynamically redirected to flow across the protected physical link.

However, many implementations of MSPs, such as MSP 30, do not support protection protocols such as Link Aggregation because they do not support cross-communication of traffic between Ethernet cards. Therefore, in the event of a network failure, a significant amount of time may be required for network reconfiguration to restore a lost connection.

Particular embodiments of the present invention provide protection for an Ethernet connection between MSP 30 and network edge device 40 by designating one Ethernet card of MSP 30 as an active card, and a second Ethernet card of MSP 30 as an inactive card for the connection. One or more ports of the two Ethernet cards may be associated so that the active Ethernet card may used to transmit and receive Ethernet traffic during normal operation and so that the inactive Ethernet card is used to send and receive traffic when a failure is detected at the active Ethernet card. If a failure is detected, a fault propagation technique may be used to deactivate the Ethernet port at the active card, and activate the Ethernet port at the inactive card, thereby indicating to the connected network edge device 40 to begin communicating with the recently activated Ethernet card. For example, network edge device 40 may be configured under Link Aggregation to automatically begin communicating with the recently activated Ethernet card. Additional details of example embodiments of the present invention are described in greater detail below.

Figure 2:
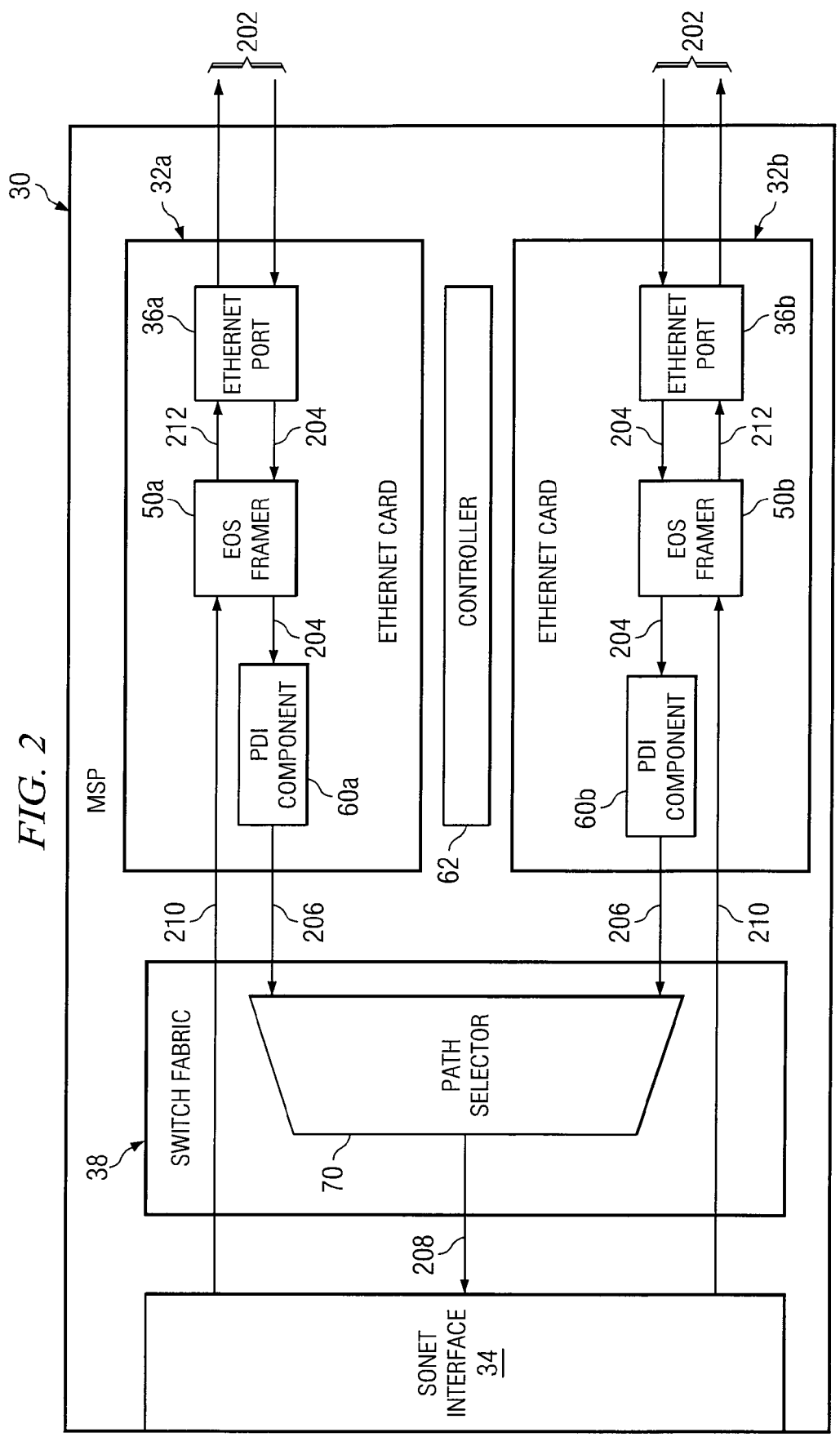
FIG. 2 is a block diagram illustrating details of a multi-service platform (MSP) in accordance with one embodiment of the present invention.

FIG. 2 is a block diagram illustrating details of MSP 30 in accordance with one embodiment of the present invention. Although selected components of MSP 30 are illustrated in FIG. 2 at a high level, it should be understood that MSP 30 may include any other well-known components of an MSP as appropriate for the operation of MSP 30.

According to the illustrated embodiment, MSP 30 includes a SONET interface 34 that communicates SONET traffic over a SONET network, such as SONET network 20 in FIG. 1. SONET interface 34 may also or alternatively include any combination of optical and/or electrical components for communicating SONET traffic.

MSP 30 also includes two Ethernet cards 32a and 32b that each communicate with a network edge device through ports 36a and 36b, as indicated by reference number 202. Ports 36 may support various physical layer media such as optical fiber, twisted pair cable, or balanced copper cable. For example, ports 36a and 36b may include a laser transmitter operable to transmit a light signal. The light signal travels through optical fibers to network edge devices that receive the light signal and convert it back into the form of the original signal (an electronic signal, for example). Although two Ethernet cards 32a and 32b are illustrated, it should be understood that any suitable number of Ethernet cards may be included in MSP 30 depending upon the implementation. Further, although two signals are illustrated by reference number 202, it should be understood that one Ethernet card 32 sends and receives one signal at a time.

MSP 30 also includes a switch fabric 38 that connects Ethernet cards 32a and 32b to SONET interface 34. For example, switch fabric 38 may be operable to communicate Synchronous Transport Signal (STS) frames to and from each Ethernet card 32 and SONET interface 34. As another example, switch fabric 38 may be operable to communicate STS frames between Ethernet cards 32.

Depending on the implementation, switch fabric 38 may perform many different well-known functions to facilitate the operation of MSP 30. For example, switch fabric 38 typically connects any number of interfaces together through switch fabric 38 to establish any type of point-to-point or point-to-multipoint connection. Although switch fabric 38 may have many other functions, one function relevant to the illustrated embodiment is the ability to select between traffic received from the active Ethernet card and the inactive Ethernet card.

According to one embodiment of the present invention, switch fabric 38 may receive two different signals, as indicated by reference number 206, and communicate a selected signal to SONET interface 34 for communication on the network, as indicated by reference number 208. To facilitate this signal selection, switch fabric 38 may include one or more path selectors 70. Such path selectors 70 may be built into the switch fabric.

Path selector 70 may be configured to select an active signal from the associated Ethernet cards 32a and 32b. For example, if path selector 70 receives an active signal from Ethernet card 32a and receives an error signal from Ethernet card 32b, then path selector 70 may select the active signal from Ethernet card 32a to be output to SONET interface 34.

According to one embodiment of the present invention, Ethernet cards 32a and 32b may send an error signal by sending a defect indicator in the signal. A defect indicator may refer to any indicator that denotes the quality of a signal, such as a Payload Defect Indicator (PDI), Payload Defect Indicator-Path (PDI-P), Payload Defect Indicator-Virtual (PDI-V), or any other suitable error indicator.

Ethernet cards 32a and 32b may send a defect indicator using PDI components 60a and 60b, according to one embodiment of the present invention. PDI components 60a and 60b may refer to any hardware and/or logic operable to send a defect indicator. In other embodiments of the invention, PDI components 60a and 60b may be components of EOS framers 50a and 50b.

According to one embodiment of the present invention, Ethernet cards 32a and 32b may send a defect indicator from an inactive card. As an example discussed in further detail below, Ethernet card 32b may be designated as an inactive card, and Ethernet card 32a may be designated as an active card. As an inactive card, Ethernet card 32b may receive various signals or no signal. For example, Ethernet card 32b may not receive a signal from network device 40. As another example, Ethernet card 32b may receive an inactive signal. An inactive signal or inactive traffic may refer to idle Ethernet frames in Ethernet traffic and may include "dummy" Ethernet traffic or "empty" Ethernet traffic. As another example, Ethernet card 32b may receive an active signal that is a copy of the signal sent to active Ethernet card 32a. An active signal or active traffic may refer to active Ethernet frames in Ethernet traffic. In each of the above examples, PDI component 60b may be configured to send a defect indicator to path selector 70. PDI component 60b may also be configured to send a defect indicator to path selector 70 if the second Ethernet card receives a defective signal or failure message from network edge device 40. Thus, path selector 70 determines that Ethernet card 32b is inactive and may select the active signal from Ethernet card 32a to be output to SONET interface 34. However, the present disclosure contemplates many types of techniques for sending defect indicators. Various embodiments may include, some, all, or none of the enumerated techniques.

Ethernet cards 32a and 32b may prepare received traffic for communication over the network to which MSP 30 is coupled. For example, Ethernet cards 32 may include EOS framers 50a and 50b (or other suitable components) that receive Ethernet traffic and generate SONET frames including the Ethernet traffic for communication over a SONET network. Conversely, EOS framers 50a and 50b may also receive SONET traffic that includes Ethernet frames and extract these Ethernet frames for communication over an Ethernet network. EOS framers may perform these functions using various encapsulation techniques. For example, GFP is a protocol for encapsulating Ethernet traffic packet data into synchronous SONET traffic. EOS framers 50a and 50b may be implemented as logic on an Ethernet card or other devices connected to switch fabric 38, or may alternatively be built into switch fabric 38.

According to the embodiment, Ethernet cards 32a and 32b are operable to map Ethernet traffic in one direction into SONET traffic, as indicated reference number 204. Switch fabric 38 receives two different signals, as indicated by reference number 206, and communicates a selected signal to SONET interface 34 for communication on the network, as indicated by reference number 208. In the opposite direction as indicated by reference number 210, SONET traffic from the SONET network is sent from switch fabric 38 to EOS framers 50a and 50b. Based on the status of ports 36a and 36b, Ethernet traffic from Ethernet cards 32a and 32b may be sent to the network edge device, as indicated by reference number 212 202.

According to one embodiment of operation, Ethernet card 32a may be designated as active while Ethernet card 32b may be designated as inactive. In the example, port 36a of Ethernet card 32a may be activated, and port 36b of Ethernet card 32b may be deactivated. As will be described in more detail below, if a network failure is detected at Ethernet card 32a or with the connection between Ethernet card 32a and network 22, Ethernet card 32b may be designated as the new active card by deactivating port 36a and activating port 36b, thereby indicating to network edge device 40 to begin communicating with Ethernet card 32b rather than Ethernet card 32a. According to various embodiments, activating and deactivating ports 36a and 36b may include turning a laser transmitter on or off at Ethernet cards 32a and 32b. For example, network edge device 40 may be configured under Link Aggregation to automatically begin communicating with the active Ethernet card transmitting traffic to network edge device 40.

MSP 30 also includes a controller 62. Controller 62 is responsible for controlling the state of Ethernet cards 32. Controller 62 may refer to any suitable logic operable to monitor Ethernet cards 32a and 32b and their connections for network failures. For example, controller 62 may include software that monitors Ethernet cards 32a and 32b by checking a hardware clock, reading registers, checking integrated circuit flags, and verifying data integrity for the signals received at Ethernet cards 32a and 32b. However, controller 62 may perform any other suitable monitoring activity.

Controller 62 is further operable to control PDI components 60a and 60b and control ports 36a and 36b based on the status of Ethernet cards 32a and 32b. For example, Ethernet card 32a may be designated as active while Ethernet card 32b may be designated as inactive. For the active card, controller 62 may activate port 36a of Ethernet card 32a. For the inactive card, controller 62 may deactivate port 36b and configure PDI component 60b to send a defect indicator from Ethernet card 32b.

If controller 62 detects a network failure at Ethernet card 32a, controller 62 may deactivate port 36a and activate port 36b. According to various embodiments, activating and deactivating ports 36a and 36b may include turning a laser transmitter on or off at Ethernet cards 32a and 32b. Controller 62 may also configure PDI component 60b to stop sending a defect indicator and configure PDI component 60a to send a defect indicator. Thus, network edge device 40 begins communicating with Ethernet card 32b rather than Ethernet card 32a, as further described below.

Figure 3:
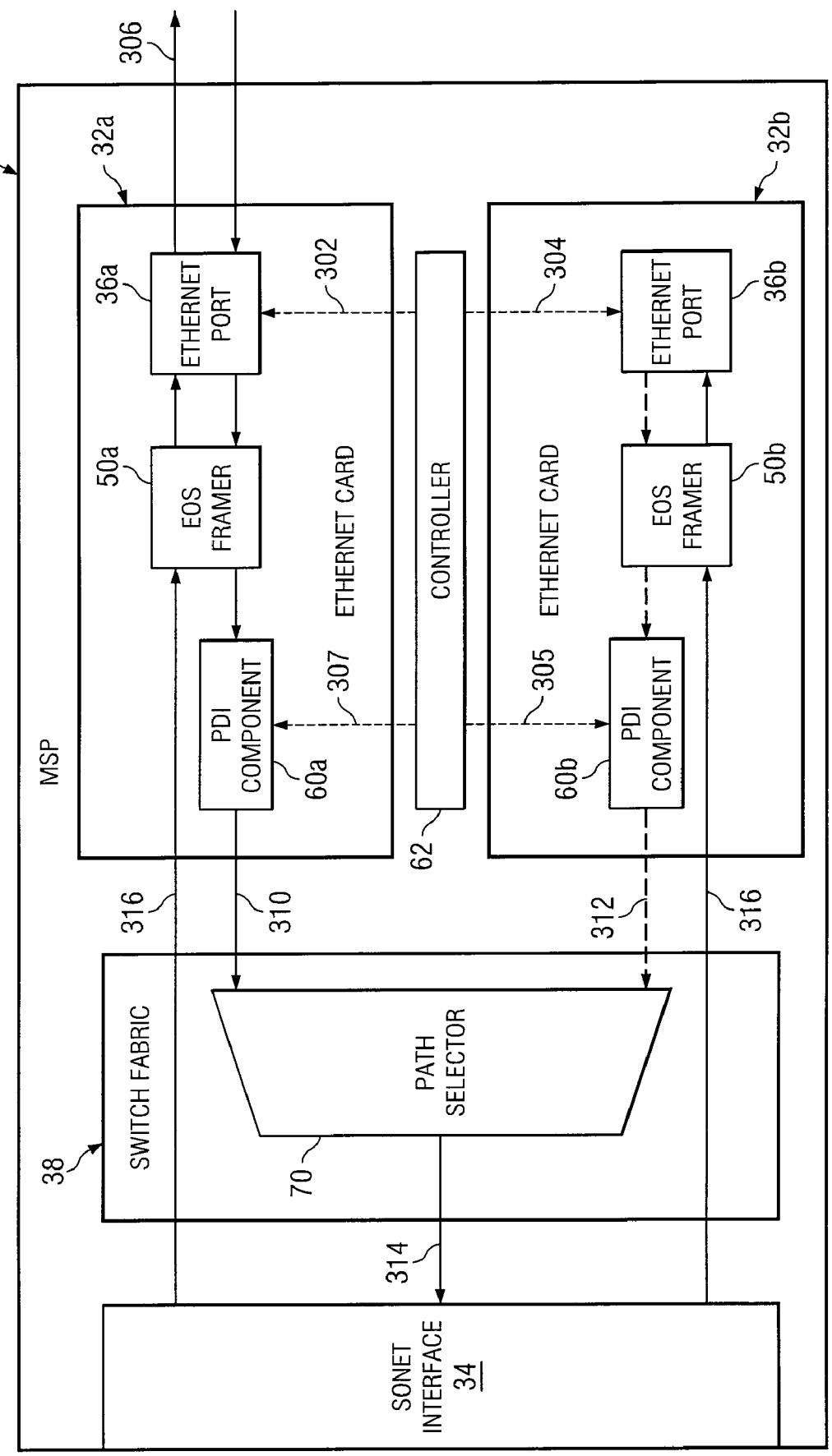
FIG. 3 is a block diagram illustrating operation of an MSP with a primary Ethernet card being active, in accordance with one embodiment of the present invention.

FIG. 3 is a block diagram illustrating operation of MSP 30 with a primary Ethernet card being active, in accordance with one embodiment of the present invention. In the illustrated embodiment, a network edge device, such as network edge device 40, coupled to ports 36a and 36b may be configured to communicate Ethernet traffic. For example, controller 62 may designate Ethernet card 32a as an active card and may designate Ethernet card 32b as an inactive card.

Controller 62 may facilitate this designation at Ethernet card 32a by activating port 36a, as indicated by reference number 302. Activating port 36a may include turning a laser transmitter on at Ethernet card 32a. Controller 62 may also designate Ethernet card 32b as an inactive card by deactivating port 36b, as indicated by reference number 304. Deactivating port 36b may include turning a laser transmitter off at Ethernet card 32b.

Controller 62 may further facilitate this designation at Ethernet card 32b by configuring PDI component 60b to send a defect indicator, as indicated by reference number 305. Controller 62 may also designate Ethernet card 32a as an active card by configuring PDI component 60a to forward a signal without sending a defect indicator, as indicated by reference number 307. Alternatively, PDI component 60a may be configured to forward the signal without sending a defect indicator by default.

As indicated by reference number 306, an active signal may be communicated from port 36a at Ethernet card 32a, and no signal may be communicated from port 32b at Ethernet card 32b. A network edge device, such as network edge device 40, may respond to the active signal by communicating an active signal to port 36a and no signal to 32b. For example, network edge device 40 may be configured under Link Aggregation to automatically begin communicating with the active Ethernet card 32a.

As indicated by reference number 310, the active signal received from the network edge device is forwarded by PDI component 60a to path selector 70. As indicated by reference number 312, PDI component 60b sends a defect indicator to path selector 70. Thus, path selector 70 selects the active signal from Ethernet card 32a to be sent to SONET interface 34 for communication on the SONET network, as indicated by reference number 314.

As indicated by reference number 316, a signal comprising SONET traffic may be received from the SONET network, and transmitted through switch fabric 38 to EOS framers 50a and 50b. For the active Ethernet card 32a, the signal may be converted from SONET traffic to Ethernet traffic by EOS framer 50a and forwarded to the network edge device, as indicated by reference number 306. For the inactive Ethernet card 32b, the signal is not forwarded because port 36b is deactivated.

Thus, Ethernet card 32b may be used as a redundant card to facilitate substitution in the event of a failure at Ethernet card 32a. Therefore, if Ethernet card 32a experiences a failure that prevents communication with the network edge device, the Ethernet connection may be protected by communicating the traffic to and from Ethernet card 32b instead of Ethernet card 32a as described in greater detail below with reference to FIG. 4.

Figure 4:
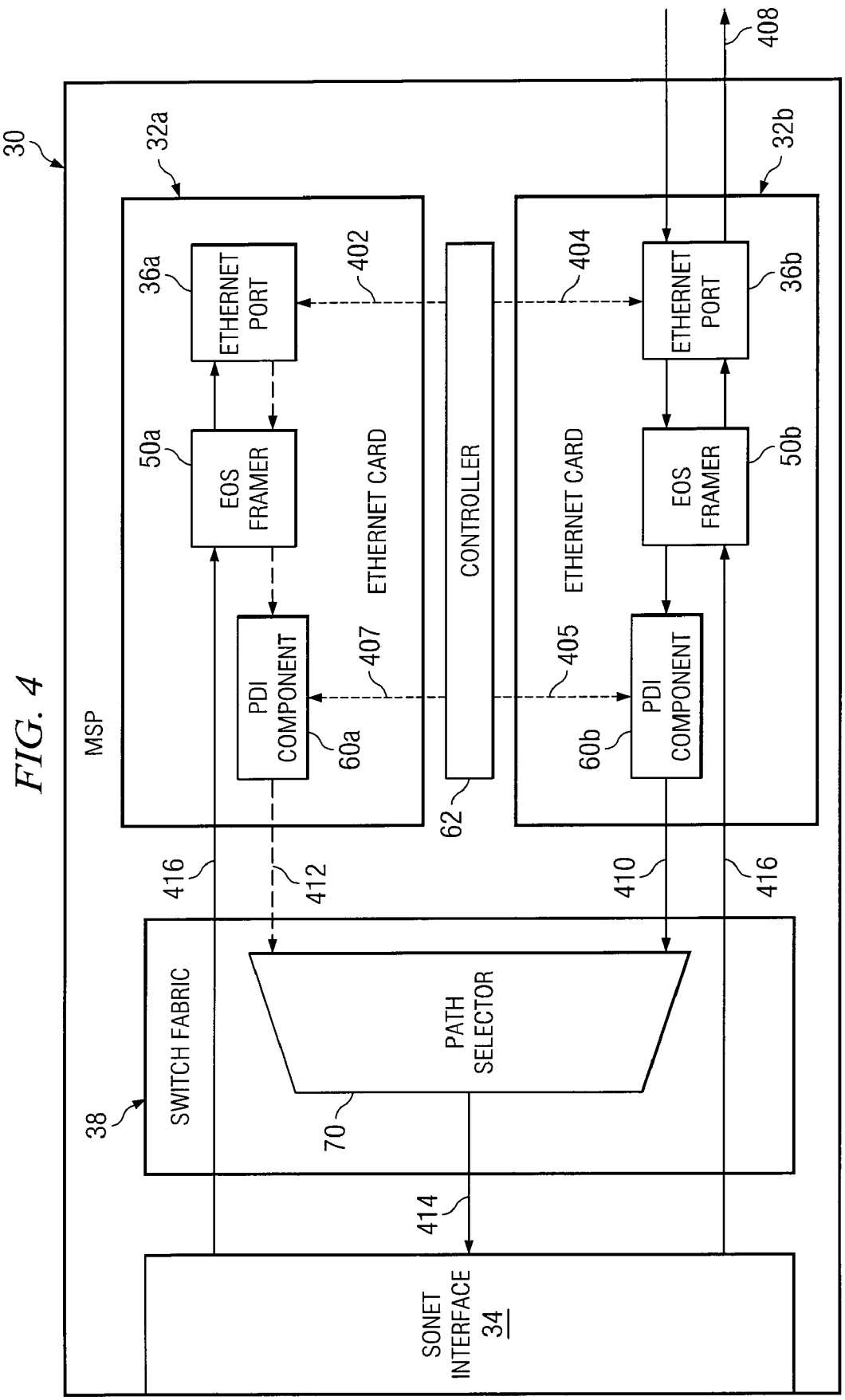
FIG. 4 is a block diagram illustrating operation of an MSP with a secondary Ethernet card being active, in accordance with one embodiment of the present invention.

FIG. 4 is a block diagram illustrating operation of MSP 30 with a secondary Ethernet card being active, in accordance with one embodiment of the present invention. In the illustrated embodiment, if controller 62 detects a network failure at Ethernet card 32a, the controller 62 may switch the connection to secondary Ethernet card 32b by deactivating port 36a, as indicated by reference number 402, and activating port 36b, as indicated by reference number 404. According to various embodiments, activating and deactivating ports 36a and 36b may include turning a laser transmitter on and off at Ethernet cards 32a and 32b. Controller 62 may further facilitate the switch by configuring PDI component 60b to stop sending a defect indicator, as indicated by reference number 405. Controller 62 may also configure PDI component 60a to start sending a defect indicator, as indicated by reference number 407.

A network edge device, such as network edge device 40, may detect that Ethernet card 32a is no longer sending an active signal and may detect that Ethernet card 32b is sending an active signal, as indicated by reference number 408. Thus, network edge device may communicate an active signal to Ethernet card 32b and no signal to Ethernet card 32a. For example, network edge device 40 may be configured under Link Aggregation to automatically begin communicating with the active Ethernet card 32b.

As indicated by reference number 410, the active signal received from the network edge device is forwarded by PDI component 60b to path selector 70. As indicated by reference number 412, PDI component 60a sends a defect indicator to path selector 70. Thus, path selector 70 selects the active signal from Ethernet card 32b to be sent to SONET interface 34 for communication on the SONET network, as indicated by reference number 414.

As indicated by reference number 416, a signal comprising SONET traffic may be received from the SONET network, and transmitted through switch fabric 38 to EOS framers 50a and 50b. For the active Ethernet card 32b, the signal may be converted from SONET traffic to Ethernet traffic by EOS framer 50b and forwarded to the network edge device, as indicated by reference number 408. For the inactive Ethernet card 32a, the signal is not forwarded because port 36a is deactivated.

Thus, example embodiments of the present invention provide protection for an Ethernet connection between MSP 30 and Ethernet network 22 by providing an MSP that is operable to selectively activate one Ethernet card and communicate Ethernet traffic over the active Ethernet card. Upon detecting a failure, MSP 30 may be operable to automatically switch to a second Ethernet card and communicate Ethernet traffic over the second Ethernet card. Thus, a network edge device, such as network edge device 40, may be configured to detect that the previously active Ethernet card is no longer sending an active signal and communicate with the newly active Ethernet card accordingly.

FIG. 5 illustrates an example method 500 for providing protection for an Ethernet connection, in accordance with one embodiment of the present invention. The example method 500 begins at step 502 where first and second LAN cards are provided in a multi-service platform. The first and second LAN cards each include at least one port. The first and second LAN cards are coupled to a network edge device through their respective ports to communicate LAN traffic.

At step 504, the first LAN card is designated as an active card and the second LAN card is designated as an inactive card. Designating the first LAN card as an active card includes activating the port of the first LAN card such that LAN traffic is communicated from the port to the network edge device. Designating the second LAN card as an inactive card includes deactivating the port of the second LAN card such that LAN traffic is not communicated from the port to the network edge device.

At step 506, a network failure is detected that is associated with the first LAN card. At step 508, the LAN traffic is protected by designating the second LAN card as an active card and the first LAN card as an inactive card. Designating the second LAN card as an active card comprises activating the port of the second LAN card such that LAN traffic is communicated from the port to the network edge device. Designating the first LAN card as an inactive card comprises deactivating the port of the first LAN card such that LAN traffic is not communicated from the port to the network edge device. Thus, a network edge device may be configured to detect that the previously active Ethernet card is no longer sending an active signal and communicate with the newly active Ethernet card accordingly as described in FIG. 3 and FIG. 4.

It should be understood that some of the steps illustrated in FIG. 5 may be combined, modified or deleted where appropriate, and additional steps may also be added to the flowchart. Additionally, as indicated above, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within MSP 30, other and different components may be utilized to accommodate particular needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for providing protection of a local area network (LAN) connection, comprising:

providing first and second LAN cards in a multi-service platform, the first and second LAN cards each comprising at least one port, wherein the first and second LAN cards are coupled to a network edge device through their respective ports to communicate LAN traffic to and from a LAN;

providing a switch fabric in the multi-service platform, the switch fabric coupled to the first LAN card and the second LAN card, and coupled to a wide area network (WAN);

providing a path selector in the switch fabric operable to select between a first input and a second input of the path selector, the first input of the path selector coupled to the first LAN card, the second input of the path selector coupled to the second LAN card;

designating the first LAN card as an active card and the second LAN card as an inactive card, wherein designating the first LAN card as an active card comprises activating the port of the first LAN card such that LAN traffic is communicated from the port to the network edge device, wherein designating the second LAN card as an inactive card comprises deactivating the port of the second LAN card such that LAN traffic is not communicated from the port to the network edge device;

detecting a network failure associated with the first LAN card;

protecting LAN traffic communicated between the multi-service platform and the LAN by designating the second LAN card as an active card and the first LAN card as an inactive card and communicating the LAN traffic from the second LAN card to the network edge device, wherein designating the second LAN card as an active card and the first LAN card as an inactive card comprises deactivating the port of the first LAN card and activating the port of the second LAN card indicates to the network edge device to communicate LAN traffic to the second LAN card and wherein deactivating the port of the first LAN card and activating the port of the second LAN card indicates to the network edge device to communicate LAN traffic to the second LAN card; and in response to the network edge device communicating LAN traffic to the second LAN card, sending a defect indicator to the first input of the path selector such that the path selector selects traffic from the second LAN card to send over the WAN.

2. The method of claim 1, wherein the defect indicator is a Payload Defect Indicator (PDI).

3. The method of claim 1, wherein:

the ports of the first and second LAN cards each comprise at least one laser transmitter, the laser transmitter operable to transmit a light signal over an optical fiber;

activating the port of the first LAN card comprises turning the laser transmitter on; and deactivating the port of the second LAN card comprises turning the laser transmitter off.

4. A multi-service platform coupled to a local area network (LAN), comprising:

first and second LAN cards, the first and second LAN cards each comprising at least one port, wherein the first and second LAN cards are coupled to a network edge device through their respective ports to communicate LAN traffic;

a switch fabric, the switch fabric coupled to the first LAN card and the second LAN card, and coupled to a wide area network (WAN); and a path selector operable to select between a first input and a second input of the path selector, the first input of the path selector coupled to the first LAN card, the second input of the path selector coupled to the second LAN card;

wherein the multi-service platform is operable to:

designate the first LAN card as an active card and the second LAN card as an inactive card, wherein designating the first LAN card as an active card comprises activating the port of the first LAN card such that LAN traffic is communicated from the port to the network edge device, wherein designating the second LAN card as an inactive card comprises deactivating the port of the second LAN card such that LAN traffic is not communicated from the port to the network edge device;

detect a network failure associated with the first LAN card; and protect LAN traffic communicated between the multi-service platform and the LAN by designating the second LAN card as an active card and the first LAN card as an inactive card and communicating the LAN traffic from the second LAN card to the network edge device, wherein designating the second LAN card as an active card and the first LAN card as an inactive card comprises deactivating the port of the first LAN card and activating the port of the second LAN card indicates to the network edge device to communicate LAN traffic to the second LAN card and wherein deactivating the port of the first LAN card and activating the port of the second LAN card indicates to the network edge device to communicate LAN traffic to the second LAN card;

in response to the network edge device communicating LAN traffic to the second LAN card, send a defect indicator to the first input of the path selector such that the path selector selects traffic from the second LAN card to send over the WAN.

5. The multi-service platform of claim 4, wherein the defect indicator is a Payload Defect Indicator (PDI).

6. The multi-service platform of claim 4, wherein:

the ports of the first and second LAN cards each comprise at least one laser transmitter, the laser transmitter operable to transmit a light signal over an optical fiber;

activating the port of the first LAN card comprises turning the laser transmitter on; and deactivating the port of the second LAN card comprises turning the laser transmitter off.

7. A system for providing protection of a local area network (LAN) connection, comprising:

a multi-service platform, the multi-service platform comprising:

first and second LAN cards, the first and second LAN cards each comprising at least one port, wherein the first and second LAN cards are coupled to a network edge device through their respective ports to communicate LAN traffic to and from a LAN;

a switch fabric, the switch fabric coupled to the first LAN card and the second LAN card, and coupled to a wide area network (WAN); and a path selector operable to select between a first input and a second input of the path selector, the first input of the path selector coupled to the first LAN card, the second input of the path selector coupled to the second LAN card; and means for:

designating the first LAN card as an active card and the second LAN card as an inactive card, wherein designating the first LAN card as an active card comprises activating the port of the first LAN card such that LAN traffic is communicated from the port to the network edge device, wherein designating the second LAN card as an inactive card comprises deactivating the port of the second LAN card such that LAN traffic is not communicated from the port to the network edge device;

detecting a network failure associated with the first LAN card; and protecting LAN traffic communicated between the multi-service platform and the LAN by designating the second LAN card as an active card and the first LAN card as an inactive card and communicating the LAN traffic from the second LAN card to the network edge device, wherein designating the second LAN card as an active card and the first LAN card as an inactive card comprises deactivating the port of the first LAN card and activating the port of the second LAN card indicates to the network edge device to communicate LAN traffic to the second LAN card and wherein deactivating the port of the first LAN card and activating the port of the second LAN card indicates to the network edge device to communicate LAN traffic to the second LAN card;

in response to the network edge device communicating LAN traffic to the second LAN card, sending a defect indicator to the first input of the path selector such that the path selector selects traffic from the second LAN card to send over the WAN.

* * * * *

UNITED STATES PATENT AND TRADEMARK OFFICE
CERTIFICATE OF CORRECTION

| | | |
|---|---|---|
| PATENT NO. | : 7,706,254 B2 | Page 1 of 1 |
| APPLICATION NO. | : 11/564649 | |
| DATED | : April 27, 2010 | |
| INVENTOR(S) | : Francois Georges Joseph Moore et al. | |

It is certified that error appears in the above-identified patent and that said Letters Patent is hereby corrected as shown below:

Column 7, Line 19, after "number" delete "212".

Signed and Sealed this
Fourth Day of October, 2011

David J. Kappos
*Director of the United States Patent and Trademark Office*